(12) United States Patent
Hartman

(10) Patent No.: US 10,018,513 B1
(45) Date of Patent: Jul. 10, 2018

(54) THERMOWELL EXTENSION

(71) Applicant: Scott Hartman, Spearfish, SD (US)

(72) Inventor: Scott Hartman, Spearfish, SD (US)

(*) Notice: Subject to any disclaimer, the term of this patent is extended or adjusted under 35 U.S.C. 154(b) by 183 days.

(21) Appl. No.: 15/175,156

(22) Filed: Jun. 7, 2016

(51) Int. Cl.
*G01K 1/08* (2006.01)
*G01K 1/14* (2006.01)

(52) U.S. Cl.
CPC .................................. *G01K 1/14* (2013.01)

(58) Field of Classification Search
None
See application file for complete search history.

(56) References Cited

U.S. PATENT DOCUMENTS

| | | |
|---|---|---|
| 4,137,768 A | 2/1979 | Tushie |
| 4,316,624 A * | 2/1982 | Davlin ............... F16L 19/0206 285/141.1 |
| 5,399,018 A | 3/1995 | Hollander |
| 5,674,009 A | 10/1997 | Stark |
| 5,678,607 A * | 10/1997 | Krywitsky ............ F16L 15/001 138/89 |
| D397,043 S | 8/1998 | Kasman |
| 6,231,230 B1 | 5/2001 | Baldock |
| 6,599,012 B2 | 7/2003 | Gul |
| 7,465,086 B1 | 12/2008 | Foreman, Jr. |
| 8,141,443 B2 | 3/2012 | Paxton |
| 8,926,176 B2 | 1/2015 | Middleton |

FOREIGN PATENT DOCUMENTS

CA    2266148 A1    8/2006

* cited by examiner

*Primary Examiner* — Andre Allen
(74) *Attorney, Agent, or Firm* — Kyle A. Fletcher, Esq.

(57) ABSTRACT

The Thermowell extension is an adaptor that works in concert with a Thermowell and an applicable instrument. The adaptor is a male to female coupling that is adapted to interface between an opening of the Thermowell and an existing plug of the Thermowell. The adaptor raises the actual location of the opening into which the existing plug of the Thermowell is affixed in order to accommodate an insulation layer provided over an applicable pipe or conduit. The instrument is still able to extend to the closed end of the Thermowell.

15 Claims, 4 Drawing Sheets

THERMOWELL EXTENSION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of gauges and instruments, more specifically, an extension kit that works in concert with a Thermowell.

Thermowells are receptacles that are used to protect a sensor in an environment that is exposed to high temperatures and pressures. A Thermowell consists of a tube closed off at a distal end, and mounted to a surface, which may be a part of a pipe or conduit. The Thermowell is used to support an instrument, which is usually a thermometer or thermocouple. The Thermowell extends a percentage into the internal diameter of the pipe, and is heated due to conductive heat transfer with the material moving within said pipe. The temperature of the Thermowell will rise to reflect the temperature of the material moving within said pipe, and a thermocouple (for example) will be able to sense a temperature to a certain level of accuracy. The advantage of a Thermowell is that should the instrument fail, the replacement is quite simple. The Thermowell has an opening at an end opposite of the closed end. The opening enables the broken instrument to be retrieved and be replaced as needed.

Where the pipe or conduit requires insulation, a traditional Thermowell may not accommodate the overall outer diameter that results from the installation of said insulation. A need exists, which is addressed in the patent application at bar. The need is to provide an extension kit for a Thermowell that provides access to the opening of the Thermowell, which would otherwise be buried underneath said insulation.

SUMMARY OF INVENTION

The Thermowell extension is an adaptor that works in concert with a Thermowell and an applicable instrument. The adaptor is a male to female coupling that is adapted to interface between an opening of the Thermowell and an existing plug of the Thermowell. The adaptor raises the actual location of the opening into which the existing plug of the Thermowell is affixed in order to accommodate an insulation layer provided over an applicable pipe or conduit. The instrument is still able to extend to the closed end of the Thermowell.

These together with additional objects, features and advantages of the Thermowell extension will be readily apparent to those of ordinary skill in the art upon reading the following detailed description of the presently preferred, but nonetheless illustrative, embodiments when taken in conjunction with the accompanying drawings.

In this respect, before explaining the current embodiments of the Thermowell extension in detail, it is to be understood that the Thermowell extension is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the Thermowell extension.

It is therefore important that the claims be regarded as including such equivalent construction insofar as they do not depart from the spirit and scope of the Thermowell extension. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
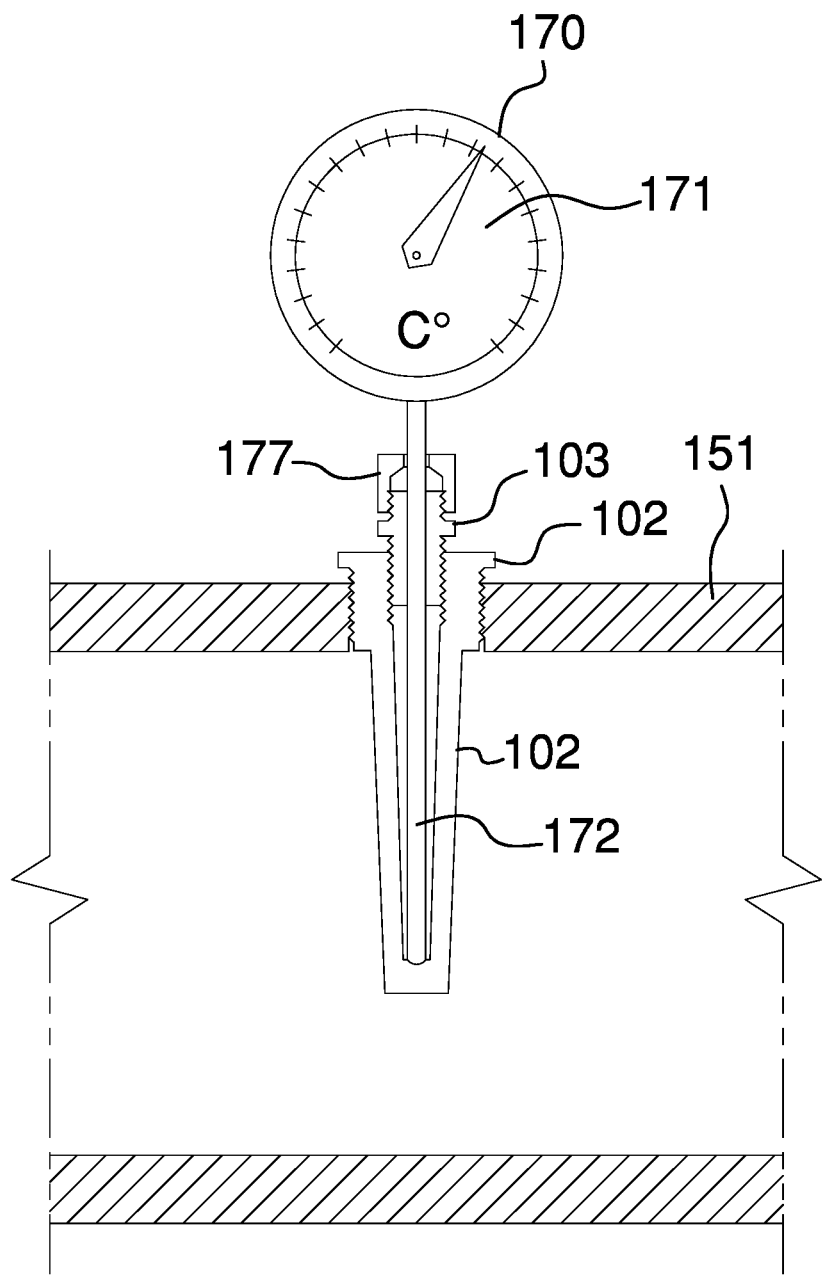
FIG. 1 is a side view of a Thermowell as prior art.
Figure 2:
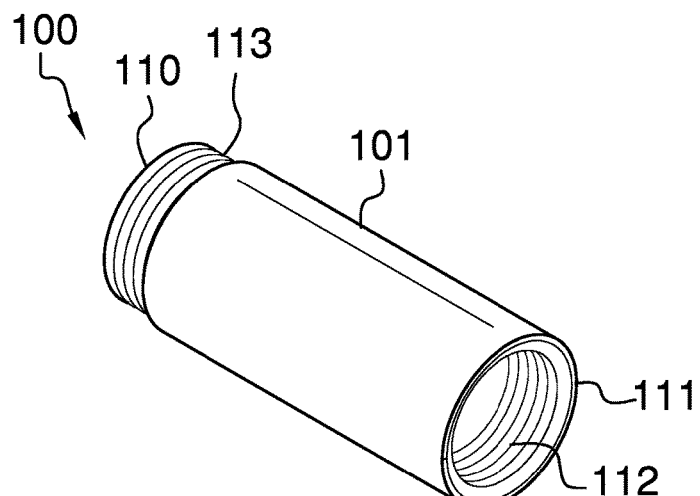
FIG. 2 is a perspective view of a component of an embodiment of the disclosure.
Figure 3:
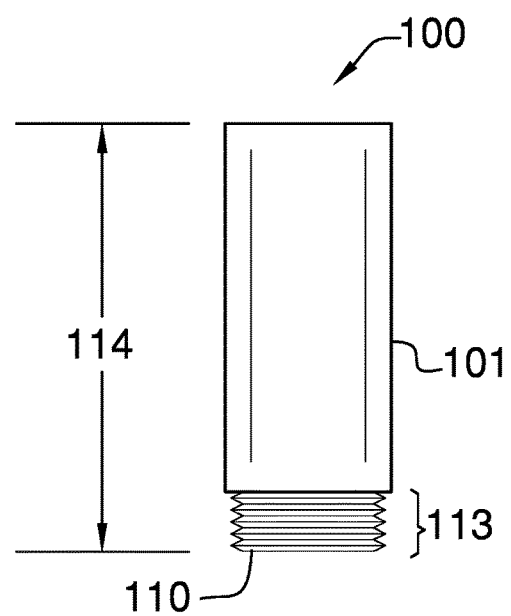
FIG. 3 is a side view of a component of an embodiment of the disclosure.
Figure 4:
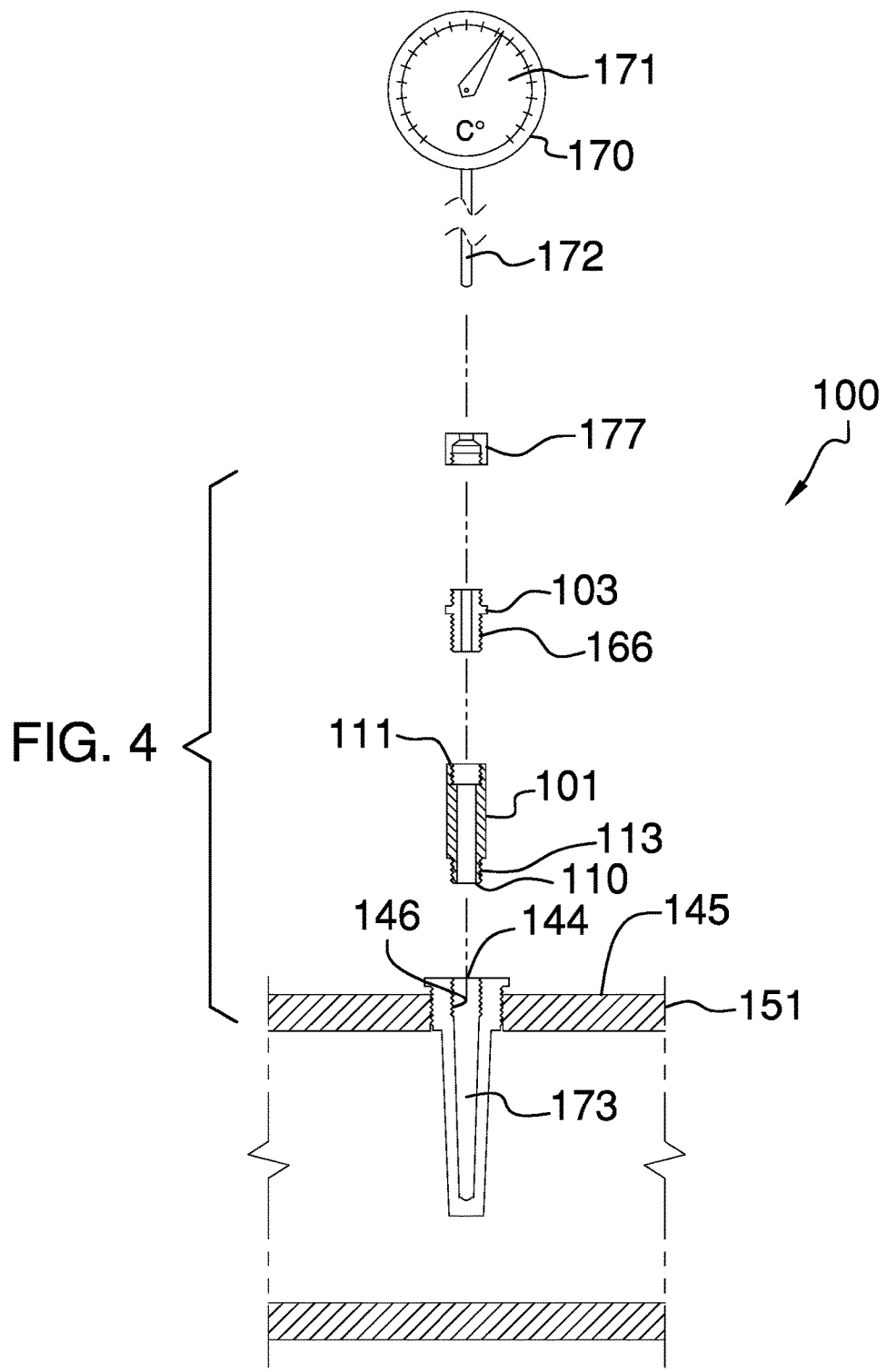
FIG. 4 is an exploded view of an embodiment of the disclosure.
Figure 5:
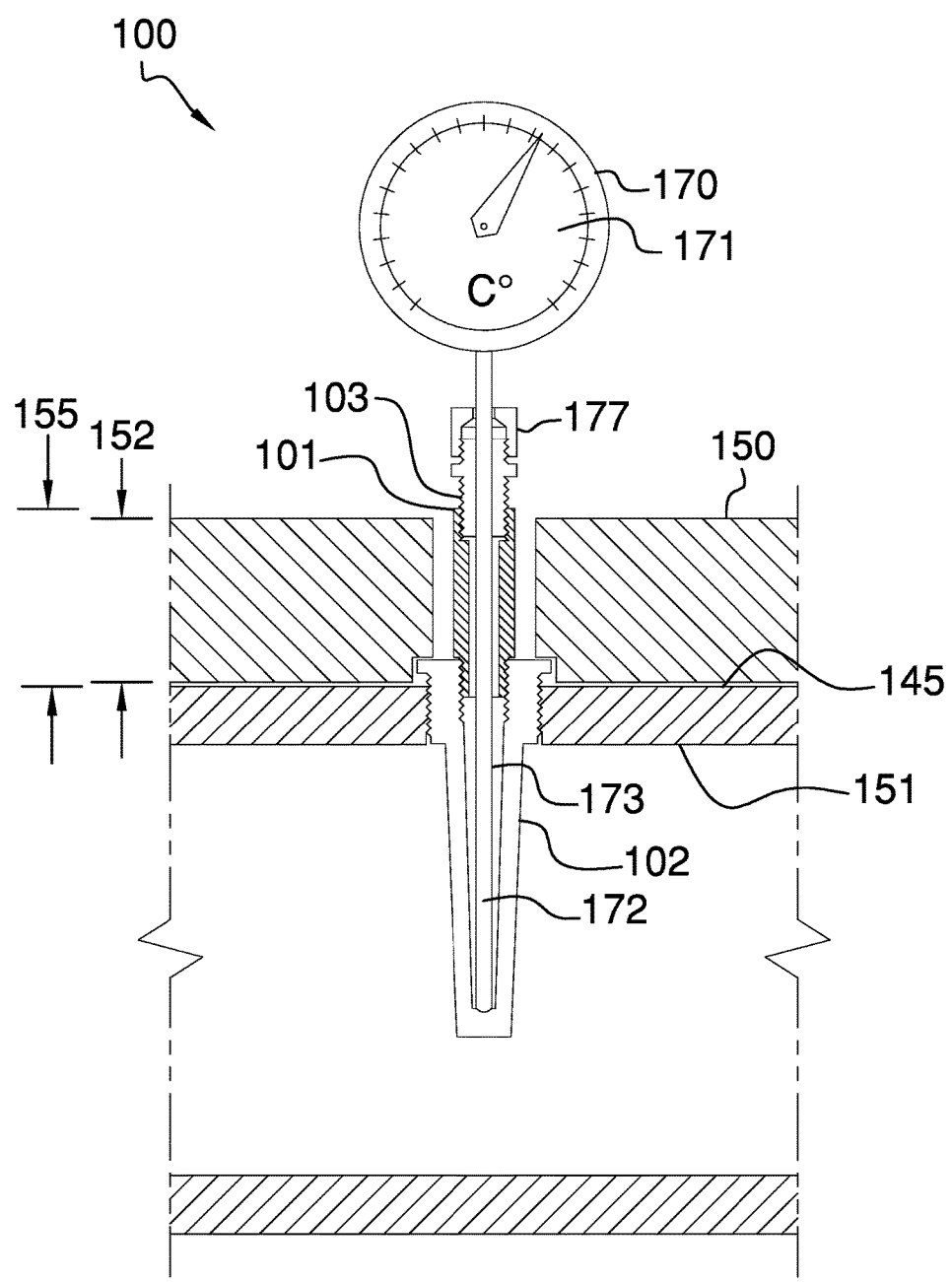
FIG. 5 is an in use view of an embodiment of the disclosure.

Detailed reference will now be made to one or more potential embodiments of the disclosure, which are illustrated in FIGS. 1 through 5.

The Thermowell extension 100 (hereinafter invention) comprises an adaptor 101 that interfaces between a thermowell 102 and a compression fitting 103. The adaptor 101 is essentially a male-to-female coupling that is further defined with a male end 110 and a female end 111. The male end 110 is distal of the female end 111. The female end 111 features internal threading 112, whereas the male end 110 features external threading 113. The adaptor 101 may be a cylindrically-shaped object that enables fluid communication between the male end 110 and the female end 111.

The adaptor 101 is further defined with an adaptor length 114. The adaptor length 114 spans from the male end 110 to the female end 111. The adaptor length 114 may vary depending on the application of use, but will be not less than 0.25 inches. It shall be noted that where a layer of insulation 150 is added onto a vessel 151, an insulation thickness 152 of the layer of insulation 150 will dictate the adaptor length 114. It shall be noted that the primary objective of the invention 100 is to increase an elevation 155 of the female end 111 in order to accommodate the layer of insulation 150.

The thermowell 102 is further defined with an opening 144, which is positioned above an outer vessel surface 145 of the vessel 151. The adaptor 101 is adapted to screw into the opening 144 via the external threading 113 provided at the male end 110. That being said, the opening 144 of the thermowell 102 includes internal thermowell threading 146 that corresponds with the external threading 113 of the male end 110 of the adaptor 101.

The compression fitting 103 is adapted to interface with the female end 111 of the adaptor 101. The compression fitting 103 includes a compression external threading 166 that corresponds with the internal threading 112 of the female end 11 of the adaptor 101. The compression fitting 103 in turn is used to secure an instrument 170 to the adaptor 101, and in turn to the thermowell 102.

It shall be noted that the term "compression fitting 103" is being used to loosely refer to a coupling that is normally screwed onto the thermowell 102 directly. A compression top 177 is screwed onto a top of the compression fitting 103. The compression top 177 interfaces with an instrument gauge 171 of the instrument 170. Moreover, the instrument 170 includes an instrument probe 172 that extends through the compression fitting 103, through the adaptor 101, and into a cavity 173 of the thermowell 102.

When in use, the invention 100 and the thermowell 102 remain in place. However, the instrument probe 172 of the instrument 170 is removed along with the compression top 177. A new instrument probe 172 is re-inserted, and secured via the compression top 177.

It shall be noted that the adaptor 101 may be made of a plurality of different materials. One consideration when selecting a suitable material is to consider the environment with which the adaptor 101 is going to be subjected to. It is envisioned that the adaptor 101 may be made of a metal, but may also be made of a ceramic, carbon fiber composite, or a plastic.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A Thermowell extension comprising:
   an adaptor that is configured to be positioned between a thermowell and a compression fitting;
   wherein the adaptor is configured to extend the compression fitting away from an outer vessel surface of a vessel in order for a layer of insulation to be positioned around said vessel whilst enabling an instrument to utilize said thermowell;
   wherein the adaptor is a male-to-female coupling that is further defined with a male end and a female end.

2. The Thermowell extension according claim 1 wherein the male end is distal of the female end; wherein the female end features internal threading; wherein the male end features external threading.

3. The Thermowell extension according claim 2 wherein the adaptor is a cylindrically-shaped object that enables fluid communication between the male end and the female end.

4. The Thermowell extension according claim 3 wherein the adaptor is further defined with an adaptor length; wherein the adaptor length spans from the male end to the female end.

5. The Thermowell extension according claim 4 wherein the adaptor length is not less than 0.25 inches; wherein the layer of insulation is added onto the vessel, an insulation thickness of the layer of insulation dictates the adaptor length; wherein an elevation of the female end is defined as a length from the outer vessel surface of the vessel to the female end; wherein the elevation is greater than or equal to the insulation thickness.

6. The Thermowell extension according claim 5 wherein the thermowell is further defined with an opening, which is positioned above the outer vessel surface of the vessel; wherein the adaptor is adapted to screw into the opening via the external threading provided at the male end; wherein the opening of the thermowell includes internal thermowell threading that corresponds with the external threading of the male end of the adaptor.

7. The Thermowell extension according claim 6 wherein the compression fitting is adapted to interface with the female end of the adaptor; wherein the compression fitting includes a compression external threading that corresponds with the internal threading of the female end of the adaptor; wherein the compression fitting in turn is used to secure the instrument to the adaptor, and in turn to the thermowell.

8. The Thermowell extension according claim 7 wherein a compression top is screwed onto a top of the compression fitting; wherein the compression top interfaces with an instrument gauge of the instrument; wherein the instrument includes an instrument probe that is configured to extend through the compression fitting, through the adaptor, and into a cavity of the thermowell.

9. A Thermowell extension comprising:
   an adaptor that is configured to be positioned between a thermowell and a compression fitting;
   wherein the adaptor is configured to extend the compression fitting away from an outer vessel surface of a vessel in order for a layer of insulation to be positioned around said vessel whilst enabling an instrument to utilize said thermowell;
   wherein the adaptor is a male-to-female coupling that is further defined with a male end and a female end;
   wherein the male end is distal of the female end;
      wherein the female end features internal threading;
      wherein the male end features external threading.

10. The Thermowell extension according claim 9 wherein the adaptor is a cylindrically-shaped object that enables fluid communication between the male end and the female end.

11. The Thermowell extension according claim 10 wherein the adaptor is further defined with an adaptor length; wherein the adaptor length spans from the male end to the female end.

12. The Thermowell extension according claim 11 wherein the adaptor length is not less than 0.25 inches; wherein the layer of insulation is added onto the vessel, an insulation thickness of the layer of insulation dictates the adaptor length; wherein an elevation of the female end is defined as a length from the outer vessel surface of the vessel to the female end; wherein the elevation is greater than or equal to the insulation thickness.

13. The Thermowell extension according claim 12 wherein the thermowell is further defined with an opening, which is positioned above the outer vessel surface of the vessel; wherein the adaptor is adapted to screw into the opening via the external threading provided at the male end; wherein the opening of the thermowell includes internal thermowell threading that corresponds with the external threading of the male end of the adaptor.

14. The Thermowell extension according claim 13 wherein the compression fitting is adapted to interface with the female end of the adaptor; wherein the compression fitting includes a compression external threading that corresponds with the internal threading of the female end of the adaptor; wherein the compression fitting in turn is used to secure the instrument to the adaptor, and in turn to the thermowell.

15. The Thermowell extension according claim 14 wherein a compression top is screwed onto a top of the compression fitting; wherein the compression top interfaces with an instrument gauge of the instrument; wherein the instrument includes an instrument probe that is configured to extend through the compression fitting, through the adaptor, and into a cavity of the thermowell.

* * * * *